Figure 1:
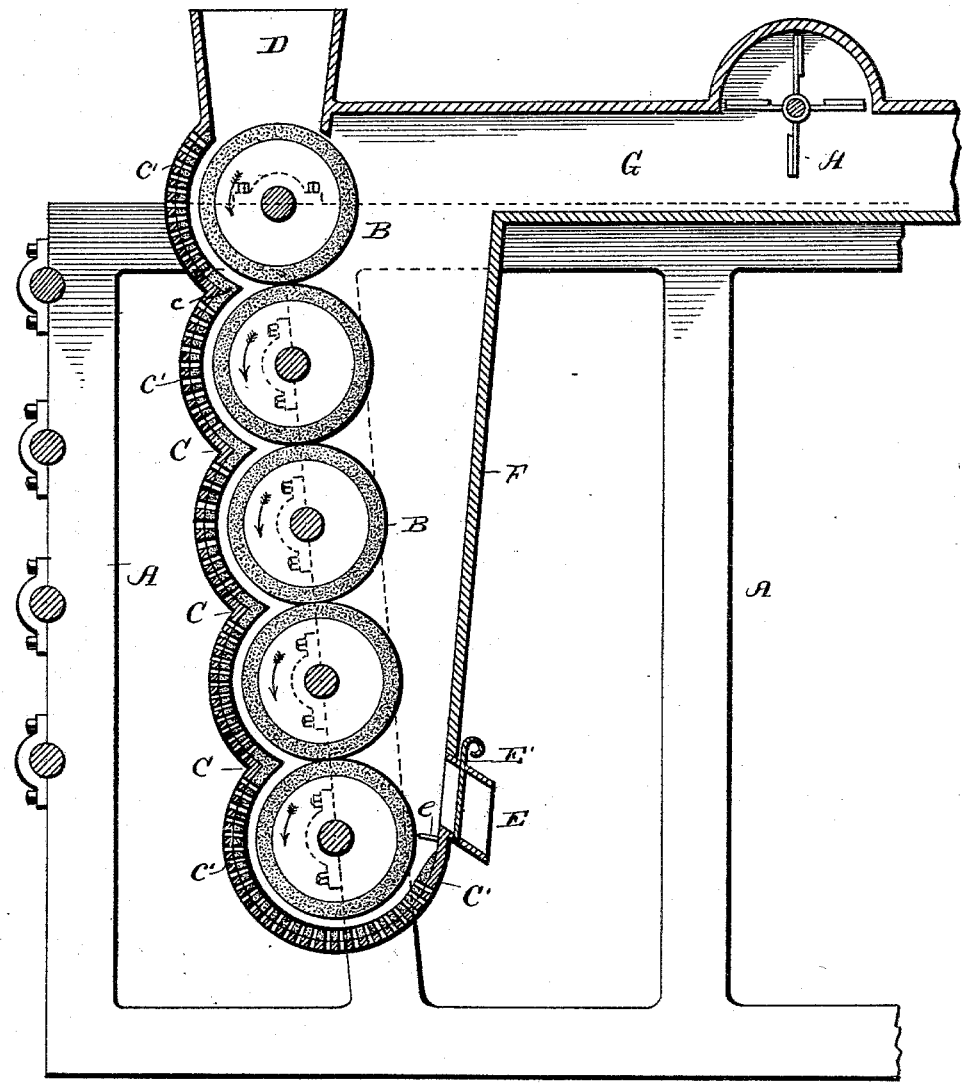

(No Model.)

J. J. FAULKNER.
COTTON SEED DELINTER.

No. 546,275. Patented Sept. 10, 1895.

3 Sheets—Sheet 1.

Witnesses
Victor J. Evans.
Marie Wilson

Inventor
James J. Faulkner.
By E. M. Marble & Sons
Attorneys (No Model.) 3 Sheets—Sheet 3.

J. J. FAULKNER.
COTTON SEED DELINTER.

No. 546,275. Patented Sept. 10, 1895.

Witnesses
Victor J. Evans.
Marie Wilson

Inventor
James J. Faulkner.
By E. M. Marble & Sons
Attorneys

UNITED STATES PATENT OFFICE.

JAMES J. FAULKNER, OF MEMPHIS, TENNESSEE, ASSIGNOR, BY DIRECT AND MESNE ASSIGNMENTS, TO THE STANDARD COTTON SEED COMPANY, OF ARKANSAS.

COTTON-SEED DELINTER.

SPECIFICATION forming part of Letters Patent No. 546,275, dated September 10, 1895.

Application filed June 17, 1895. Serial No. 553,117. (No model.)

*To all whom it may concern:*

Be it known that I, JAMES J. FAULKNER, a citizen of the United States, residing at Memphis, in the county of Shelby and State of Tennessee, have invented certain new and useful Improvements in Cotton-Seed Delinters; and I do hereby declare the following to be a full, clear, and exact description of the invention, such as will enable others skilled in the art to which it appertains to make and use the same.

My invention relates to improvements in machines for treating cotton-seed, and particularly to improvements in that class thereof known as "delinters;" and it consists in the improved cotton-seed delinter whose construction and arrangement of parts will be hereinafter fully described, and particularly pointed out in the claims.

In an application for Letters Patent filed by me June 13, 1895, Serial No. 552,686, I have described a cotton-seed delinter in which the removal of the lint from the seed is accomplished by feeding the seed into an inclosure formed by a series of positively-actuated rotating abrading-surfaces placed with their faces in sufficiently close proximity to prevent the passage of seed between the same and all caused to move in the same direction.

My present invention uses the same fundamental principle of operation which was involved in the delinter described in the above-referred-to application—namely, that when abrading-rolls which are placed with their surfaces in sufficiently close proximity to prevent passage of seed between the same are caused to rotate in the same direction and means are provided for preventing the seed under treatment from getting out of the range of action of the abrading-rolls the lint will be scoured off the surface of the seed and will be removed by the abrading-rolls as they complete their revolution, although the seed under treatment will not be drawn between the meeting surfaces of the two rolls or injured in the slightest degree during the abrading action, due to the fact that contiguous meeting faces of the rolls move in opposite directions. In my present application, instead of forming a "pocket" into which the seed to be treated is fed and relying upon an inclosure formed by the revolving abrading-rolls for holding the seed in contact with their surfaces, I provide a casing for one side of the rolls and feed the seed between the casing and the surfaces of the rolls. The rolls in this construction may be arranged at any desired angle or inclination to the bottom roll or may be curved in any convenient form, but in my preferred construction are arranged vertically one above the other, the casing being vertically placed on one side of the abrading-rolls and conforming in shape to the contour of the meeting surfaces of the abrading-rolls. Across the other face of the said rolls, which may be termed the "outer" face, I cause an air-current to sweep, so that the lint which is drawn out of the inclosed space in which the abrading action takes place upon the surface of the abrading-rolls is swept away therefrom through an air-flume to a suitable receptacle and the surfaces of the roll are left entirely clean and free from any adhering lint. By using a sufficient number of rolls journaled one above the other it would be possible to thoroughly scour the seed without providing any means for increasing the duration of the treatment of the seed in the machine. As the duration of the treatment differs, however, with different classes of seed, and in accordance with the differing conditions of the seed as it is fed into the machine, I prefer to provide positive means whereby I may vary the duration of treatment of the seed in the machine to any desired extent. I accordingly extend the casing around the bottom roll sufficiently far to compel the seed to be forcing upward with considerable force before it can escape from the upturned edge of the casing, and, further, provide means for restricting the outlet-opening to any desired degree. In this manner I am able to govern within any desired limits the duration of the treatment to which the seed is subjected in the machine, and thus to secure a highly-finished product with the use of comparatively few vertically-arranged abrading-rolls. All of the lint which is scoured off the seed by the surfaces of the rotating abrading-rolls is carried out of the inclosure within which the abrading action takes place by the rolls themselves and without the use of any additional means for causing such action to take place. As I, however, line the inner face of the casing with an abrading-surface, and as some of the lint is scoured off the seed by the abrading-surface thus formed, I provide means for carrying the lint thus scoured off the seed to the surfaces of the rotating abrading-rolls more quickly than would ordinarily be the case. For this purpose I perforate the face of the casing, so that there will be a slight draft toward the face of the abrading-rolls during the operation of the machine. This draft will carry to the surface of said rolls all of the lint removed by the action of the abrading-surface of the casing.

My invention is fully illustrated in the drawings which accompany and form a part of this application, in which the same reference-letters refer to the same or corresponding parts, and in which—

Figure 2:
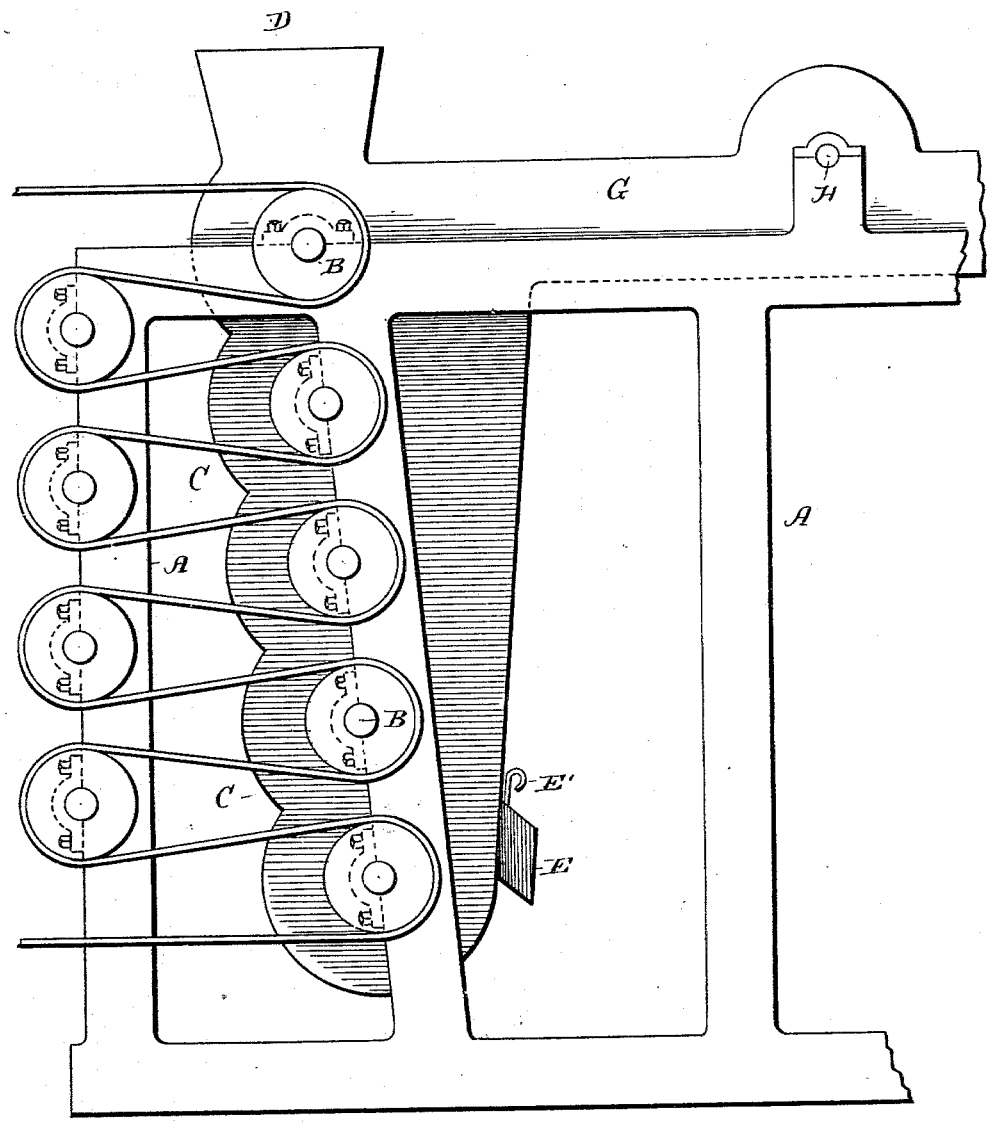
Figure 3:
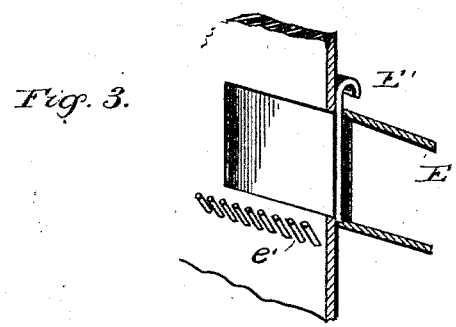
Figure 4:
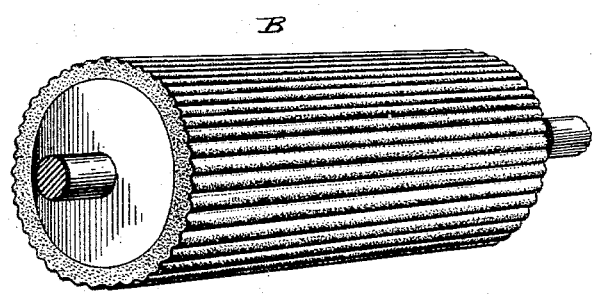
Figure 5:
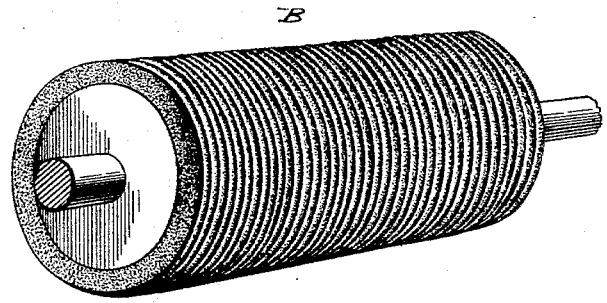
Figure 6:
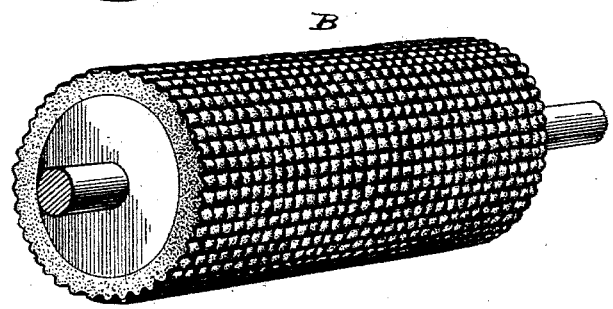

Figure 1 is a central vertical section of my machine. Fig. 2 is an end view thereof, showing the machine-frame and the power mechanism. Fig. 3 is a detail view of the seed-discharge outlet. Fig. 4 is a detail view of a modified form of the abrading-roll. Figs. 5 and 6 are detail views of further modified forms thereof.

Referring to the drawings, A represents the machine-frame, in which are formed suitable bearings for the vertically-arranged abrading-rolls B. The abrading-rolls are placed with their surfaces in sufficiently close proximity to prevent passage of seed between the same. They are caused to rotate in the same direction by a suitable connection with the power element, such as the belt connection shown in Fig. 2 of the drawings. These rolls may have either a perfectly plain surface or may have their surfaces corrugated, as shown in Figs. 4, 5, and 6. The corrugations may extend longitudinally of the abrading-rolls or circularly around the same; or, again, these two forms may be combined in any convenient manner and have any desired angle or inclination to each other. It is not necessary when the rolls are arranged vertically that the rolls be placed as closely together as in other constructions, as there is no special tendency in this construction for the seed to pass into the angle formed by the meeting surfaces of the two rolls.

For one face of the abrading-rolls I form the casing C, which is provided with an emery lining c and which is perforated, as shown at c'. The casing projects slightly above the top of the upper roll to form a feed-opening D, which extends entirely across the rolls. The casing is also curved around the lower abrading-roll and extended upward a short distance, as shown at C', so that the seed, in order to be discharged from the machine, will have to force itself up the incline thus formed before it can be discharged through the discharge-spout E. Projecting pins e extend inward from the casing just below the discharge-outlet to prevent the seed forcing itself up to too great a height. The valve E' controls the discharge-outlet, so that the duration of the treatment of the seed in the machine may be varied within any desired limits. I cause an air-current to sweep over the outer surface of the abrading-rolls, and thus to free the same from the lint which was carried out of the inclosure in which the abrading action is taking place, by journaling a fan H in the air-flume G, one face F of which extends downward to the discharge-spout, thus forming an inclosure through which the air-current may sweep. The upward draft at the discharge-outlet facilitates the rise of the seed at this point and is one of the reasons which render necessary the use of the projecting pins e. The fan H in its operation draws its supply of air through the perforations of the casing C, thus causing outward air-currents to issue between adjacent rolls and insuring the removal of all of the lint separated from the seed from the inclosure in which the delinting operation takes place.

The operation of my machine is as follows: Seed is fed into the machine across the entire length of the abrading-rolls through the feed-spout D, and, passing down into the inclosure formed between the casing C and the abrading-rolls B, is subjected to a constant scouring action, which causes the lint to be removed from the surface of the seed. The lint removed by the abrading-faces of the rolls B is at once carried out by said rolls as they complete their revolution and swept into the air-flume G by the air-current created by the action of the fan H. The lint scoured from the seed by the abrading-surface of the casing is forced onto the abrading-surfaces of the rolls by the air drawn in through the perforations in the casing by the suction of the exhaust-fan. In this manner a complete removal of the lint from the seed is caused to take place, and as the lint-removing surface in this machine is very large the removal of the lint separated by the action of the machine takes place instantly and uniformly throughout the entire abrading action. Coarse dirt, such as leaves and bolls, and all impurities which are too large to be drawn out between the abrading-rolls in the action of the machine fall through perforations in the casing, and are thus discharged from the inclosure in which the abrading action takes place. The seed as it finally reaches the bottom of the series of rolls and is forced by the pressure of the seed in the machine upward between the projecting pins e and out through the valved discharge-opening E is thoroughly cleansed and all the lint removed from the surfaces thereof.

Having thus fully described my invention, what I claim as new, and desire to secure by Letters Patent, is—

1. In a cotton seed delinter, the combination with a series of positively-actuated abrading rolls, placed with their surfaces in sufficiently close proximity to prevent passage of seed between the same, and means for causing said rolls to rotate in the same direction, of seed inlet and discharge openings, and means for causing air currents to issue between adjacent rolls, substantially as described.

2. In a cotton seed delinter, the combination with a series of positively-actuated abrading rolls, placed with their surfaces in sufficiently close proximity to prevent passage of seed between the same, and means for causing said rolls to rotate in the same direction, of means for keeping the seed under treatment in contact with one side of said rolls, seed inlet and discharge openings, and means for causing air currents to issue between adjacent rolls, substantially as described.

3. In a cotton seed delinter, the combination with a series of positively-actuated rotating abrading rolls, placed with their surfaces in sufficiently close proximity to prevent passage of seed between the same, and means for causing said rolls to rotate in the same direction, of a casing for one side of said rolls, seed inlet and discharge openings, and means for causing air currents to issue between adjacent rolls, substantially as described.

4. In a cotton seed delinter, the combination with a series of positively-actuated abrading rolls, placed with their surfaces in sufficiently close proximity to prevent passage of seed between the same, and means for causing said rolls to rotate in the same direction, of a perforated casing for one side of said rolls, seed inlet and discharge openings, and means for causing air currents to issue between adjacent rolls, substantially as described.

5. In a cotton seed delinter, the combination with a series of positively-actuated abrading rolls, placed with their surfaces in sufficiently close proximity to prevent passage of seed between the same, and means for causing said rolls to rotate in the same direction, of a casing for one side of said rolls, conforming with the contour thereof, seed inlet and discharge openings, and means for removing the lint separated by the action of the machine, substantially as described.

6. In a cotton seed delinter, the combination with a series of positively-actuated abrading rolls, placed with their surfaces in sufficiently close proximity to prevent passage of seed between the same, and means for causing said rolls to rotate in the same direction, of a casing for one side of said rolls conforming to the contour thereof, seed inlet and discharge openings, and means for causing air currents to issue between adjacent rolls, substantially as described.

7. In a cotton seed delinter, the combination with a vertical series of positively-actuated abrading rolls, placed with their surfaces in sufficiently close proximity to prevent passage of seed between the same, and means for causing said rolls to rotate in the same direction, of a casing for one side of said rolls, a feed inlet opening at the top of the casing, a discharge opening at the bottom thereof, and means for removing the lint separated by the action of the machine, substantially as described.

8. In a cotton seed delinter, the combination with a vertical series of positively-actuated abrading rolls, placed with their surfaces in sufficiently close proximity to prevent passage of seed between the same, and means for causing said rolls to rotate in the same direction, of a casing for one side of said rolls, said casing extending at the discharge end nearly around the bottom roll, seed inlet and discharge openings, and means for removing the lint separated by the action of the machine, substantially as described.

9. In a cotton seed delinter, the combination with a vertical series of positively-actuated abrading rolls, placed with their surfaces in sufficiently close proximity to prevent passage of seed between the same, and means for causing said rolls to rotate in the same direction, of a casing for one side of said rolls, said casing extending at the discharge end nearly around the bottom roll, seed inlet and discharge openings, means for removing the lint separated by the action of the machine, and pins projecting on the end of the bent portion of the casing toward the surface of the bottom roll, substantially as described.

10. In a cotton seed delinter, the combination with a series of corrugated positively-actuated abrading rolls, placed with their surfaces in sufficiently close proximity to prevent passage of seed between the same, and means for causing said rolls to rotate in the same direction, of seed inlet and discharge openings, means for removing the lint separated by the action of the machine, and means for keeping the seed under treatment in contact with the abrading surfaces, substantially as described.

In testimony whereof I affix my signature in presence of two witnesses.

JAMES J. FAULKNER.

Witnesses:
R. W. RAMSEY,
JOHN HALLUM.